United States Patent [19]

Yoshizawa et al.

[11] Patent Number: 5,132,171
[45] Date of Patent: Jul. 21, 1992

[54] NON-FLAMMABLE OPEN-CELL CROSS-LINKED POLYOLEFIN FOAM AND METHOD FOR PRODUCTION THEREOF

[75] Inventors: Iwao Yoshizawa, Tsuzuki; Tomoyoshi Shibata, Uji; Kanako Kaji, Osaka; Motoyoshi Hatada, Neyagawa, all of Japan

[73] Assignees: Sanwa Kako Company Limited; Japan Atomic Energy Research Institute; Research Department Corporation of Japan, all of Japan

[21] Appl. No.: 719,140

[22] Filed: Jun. 21, 1991

[30] Foreign Application Priority Data

Jul. 6, 1990 [JP] Japan .................. 2-177591

[51] Int. Cl.⁵ .............................. B32B 3/26
[52] U.S. Cl. .................. 428/317.1; 427/207.1; 427/243; 427/244; 428/317.3; 428/317.7; 428/317.9; 428/323; 428/343; 428/355; 428/921
[58] Field of Search ............ 427/207.1, 243, 244; 428/317.1, 317.3, 317.7, 317.9, 323, 343, 355, 921

[56] References Cited

U.S. PATENT DOCUMENTS

| | | | |
|---|---|---|---|
| 4,277,532 | 7/1981 | Czepel et al. | 428/317.9 |
| 4,296,166 | 10/1981 | Ogino | 428/317.9 |
| 4,435,346 | 3/1984 | Ito et al. | 264/54 |

FOREIGN PATENT DOCUMENTS

| | | |
|---|---|---|
| 48-9587 | 3/1973 | Japan . |
| 58-5930 | 2/1983 | Japan . |
| 60-26500 | 6/1985 | Japan . |
| 60-34492 | 8/1985 | Japan . |
| 63-195104 | 8/1988 | Japan . |
| 2-22317 | 1/1990 | Japan . |
| 2-215844 | 8/1990 | Japan . |

*Primary Examiner*—William J. Van Ballen
*Attorney, Agent, or Firm*—Frost & Jacobs

[57] ABSTRACT

An open-cell cross-linked polyolefin foam possessing extremely high non-flammability is produced by dispersing a thermally expansible graphite in an adhesive agent and applying the resultant adhesive agent mixture to at least part of the surface of a flame-retardant open-cell cross-linked polyolefin foam. As the flame-retardant open-cell cross-linked polyolefin foam, an open-cell cross-linked polyolefin foam which possesses a polymer of a phosphorus type flame-retarding agent in the interior and the surface of the open-cell foam or an open-cell cross-linked polyolefin foam which contains a halogen type flame-retarding agent in the cell membranes thereof and possesses a polymer of a phosphorus type flame-retarding agent in the interior and the surface of the open-cell foam is preferably used.

31 Claims, No Drawings

NON-FLAMMABLE OPEN-CELL CROSS-LINKED POLYOLEFIN FOAM AND METHOD FOR PRODUCTION THEREOF

BACKGROUND OF THE INVENTION

1. Field of the Invention

This invention relates to a non-flammable open-cell cross-linked polyolefin foam and a method for the production thereof.

2. Description of the Prior Art

The open-cell cross-linked polyolefin foam recently developed is inexpensive and excellent in such physical properties as cushioning property, heat-insulating property, and sound absorbing property and, therefore, has been finding extensive utility in various applications including cushioning materials, packing materials, filters, coating applicator, and sound absorbing materials.

Polyolefin resins such as polyethylene and polypropylene are highly flammable and emit intense heat during combustion. This fact has prevented the open-cell polyolefin foams from being used in flooring materials, wall materials, and interior materials for aircraft.

Heretofore, for the production of flame-retardant foams, a method which comprises heating and expanding a foamable polyolefin resin composition incorporating therein an inorganic filler [for example, see Japanese Patent Publication No. SHO 60(1985)-26,500] and a method which comprises heating and expanding a foamable polyolefin resin composition incorporating therein a phosphorus type or halogen type flame-retarding agent [for example, see Japanese Patent Publication No. SHO 48(1973)-9,587, and Japanese Patent Publication No. SHO 58(1983)-5,930], etc. have been adopted.

The method involving the incorporation of an inorganic filler requires the inorganic filler to be incorporated in a large amount into the foamable resin composition for the purpose of imparting the desired flame-retarding property to the produced foam. This method, therefore, incurs difficulty in producing a foam of an expansion ratio of not less than 30 times the original volume and prevents the produced foam from manifesting outstanding flexibility and elongation inherent in a foamed product. On the other hand, the method involving the incorporation of a halogen type flame-retarding agent tends to encounter an increasingly harsh restriction because the flame-retarding agent itself and the gas liberating therefrom are toxic.

In any event, the two methods mentioned above concern production of a closed-cell foam and are not easily adapted for the porduction of an open-cell cross-linked polyolefin foam. This is because the open-cell foam contains the air which promotes combustion in a larger amount than the closed-cell foam and the inorganic filler or flame-retarding agent, even when added to the open-cell foam in the same ratio as to the closed-cell foam, fails to impart a satisfactory flame-retarding property to the open-cell foam. Thus, the open-cell foam is not allowed to acquire the desired flame-retarding property. Besides, the incorporation of the inorganic filler or flame-retarding agent in a large amount prevents the produced open-cell foam from acquiring a satisfactory quality because this foam necessitates very exacting foaming conditions.

SUMMARY OF THE INVENTION

A main object of this invention, therefore, is to provide an open-cell cross-linked polyolefin foam which is free from the drawbacks of the aforementioned prior arts and which possesses a high flame-retarding property (or non-flammability) at no sacrifice of the outstanding physical properties inherent in an open-cell cross-linked polyolefin foam and a method for the production (flame retardation) thereof.

Another object of this invention is to provide a non-flammable open-cell cross-linked polyolefin foam capable of being produced with high efficiency by a relatively simple procedure.

A further object of this invention is to provide an open-cell cross-linked polyolefin foam enjoying non-flammability and a high expansion ratio while retaining the outstanding physical properties of an open-cell polyolefin foam such as flexibility, elongation, and weatherability.

To accomplish these objects, in accordance with this invention, there is provided a non-flammable open-cell cross-linked polyolefin foam which is characterized by having at least part of the surface of the flame-retardant open-cell cross-linked polyolefin foam coated with an adhesive agent containing thermally expansible graphite.

Preferably, as the flame-retardant open-cell cross-linked polyolefin foam mentioned above, an open-cell cross-linked polyolefin foam having a polymer of phosphorus type flame-retarding agent in the interior and the surface of an open-cell foam or an open-cell cross-linked polyolefin foam containing a halogen type flame-retarding agent in the cell membranes and also having a polymer of phosphorus type flame-retarding agent in the interior and the surface of an open-cell foam is used.

This invention further provides a method for the production of a non-flammable open-cell cross-linked polyolefin foam, which comprises dispersing thermally expansible graphite in an adhesive agent and applying the resultant graphite-containing adhesive agent to at least part of the surface of a flame-retardant open-cell cross-linked polyolefin foam.

In one preferred embodiment of this invention, there is provided a method for the production of a non-flammable open-cell cross-linked polyolefin foam, which comprises impregnating an open-cell cross-linked polyolefin foam with a phosphorus type flame-retarding agent, then irradiating the impregnated open-cell cross-linked polyolefin foam with an ionizing radiation thereby forming an insoluble polymer of said flame-retarding agent in the interior and the surface of the open-cell foam and giving rise to a flame-retardant open-cell cross-linked polyolefin foam, and thereafter applying an adhesive agent containing thermally expansible graphite to at least part of the surface of said flame-retardant open-cell cross-linked polyolefin foam.

In another preferred embodiment of this invention, there is provided a method for the production of a non-flammable open-cell cross-linked polyolefin foam, which comprises foaming a foamable and cross-linkable polyolefin resin composition containing a halogen type flame-retarding agent thereby giving rise to a foam, then mechanically deforming this foam thereby establishing intercommunication among the cells of the foam and producing an open-cell cross-linked polyolefin foam, subsequently impregnating said open-cell cross-linked polyolefin foam with a phosphorus type flame-retarding agent, irradiating the impregnated open-cell cross-linked polyolefin foam with an ionizing radiation thereby forming an insoluble polymer of said phosphorus type flame-retarding agent in the interior and the surface of the open-cell foam and giving rise to a flame-retardant open-cell cross-linked polyolefin foam, and thereafter applying an adhesive agent containing thermally expansible graphite to at least part of the surface of said flame-retardant open-cell cross-linked polyolefin foam.

The above and many other advantages, features and additional objects of the present invention will become apparent to those skilled in the art upon making reference to the following detailed description.

DETAILED DESCRIPTION OF THE INVENTION

The impartation of non-flammability to an open-cell cross-linked polyolefin foam contemplated by this invention is attained by coating the surface of the flame-retardant open-cell cross-linked polyolefin foam with an adhesive agent containing thermally expansible graphite and is aimed at preventing the produced non-flammable open-cell cross-linked polyolefin foam from combustion by causing the graphite adhering to the surface of the foam, when the surface of the foam is exposed to a flame, to expand thermally and cover the surface of the foam. Further, since the adhesive agent fulfils the function of a binder between the thermally expansible graphite and the foam, the possibility of the thermally expansible graphite falling off from the foam and impairing the flexibility of the foam itself is nil.

The inventors formerly developed a method for modifying an open-cell polyolefin foam characterized by impregnating an open-cell polyolefin foam with a vinyl phosphonate compound and then irradiating the impregnated open-cell polyolefin foam with an electron beam thereby giving rise to an insoluble polymer in the interior and the surface of the foam [see Japanese Patent Application laid open to public inspection; KOKAI No. HEI 2(1990)-22,317]. They subsequently developed a method of producing a flame-detardant open-cell cross-linked polyolefin foam by combined use of a halogen type flame-retarding agent and a phosphorus type flame-retarding agent [see Japanese Patent Application laid open to public inspection: KOKAI No. HEI 2(1990)-215844.

The flame-detardant open-cell cross-linked polyolefin foams obtained by the methods mentioned above possess a satisfactory flame-retarding property. When it is exposed to a flame of a high temperature exceeding 1,000° C., however, it catches fire and sustains holes at the site of combustion and consequently falls short of manifesting non-flammability.

On the other hand, a product obtained by coating the surface of an ordinary open-cell cross-linked polyolefin foam with the aforementioned adhesive agent containing thermally expansible graphite used in an ordinary application rate brings about a similar situation and falls short of manifesting non-flammability. Therefore, the combination of said two measures was expected to bring about a similar effect. When said two measures were actually combined, however, the product on exposure to a flame of a high temperature exceeding 1,000° C. unexpectedly refrained from catching fire and barely sustained a slight dent at the site of exposure to the flame. The present invention has been perfected on the basis of this knowledge. The product of the present invention is believed to manifest the non-flammability owing to the synergistic operation between the flame-retarding effect imparted by the flame-retarding agent to the open-cell cross-linked polyolefin foam itself and the combustionproofing effect brought about by the coating with the aforementioned adhesive agent containing the thermally expansible graphite.

The flame-retardant open-cell cross-linked polyolefin foam to be used in the present invention may be any of various open-cell cross-linked polyolefin foams which have undergone a flame-retarding treatment. Particularly, open-cell cross-linked polyolefin foams which have undergone an internal flame-retarding treatment using a phosphorus type flame-retarding agent alone or in combination with a halogen type flame-retarding agent are used advantageously. Such a flame-retardant open-cell cross-linked polyolefin foam is obtained by first mixing a polyolefin with a foaming agent, a cross-linking agent and optionally a foaming aid, a filler, and a pigment, thoroughly kneading the resultant mixture as with a heated mixing roll thereby forming a foamable cross-linkable composition, optionally further adding a halogen type flame-retarding agent to the foamable cross-linkable composition, foaming this composition thereby producing a foam, then mechanically deforming the foam thereby establishing intercommunication among the cells of the foam and consequently obtaining an open-cell cross-linked polyolefin foam, thereafter impregnating the open-cell cross-linked polyolefin foam with a phosphorus type flame-retarding agent, and irradiating the impregnated open-cell cross-linked polyolefin foam with an electron beam thereby giving rise to an insoluble polymer of said phosphorus type flame-retarding agent in the interior and the surface of the open-cell foam.

The method to be employed for the productin of said open-cell foam is not particularly specified but may be selected from among various methods heretofore known to the art. Among these methods, the method which, as disclosed in U.S. Pat. No. 4,435,346, the teachings of which are hereby incorporated by reference, comprises thermally shaping a foamable cross-linkable composition in a desired shape, then heating the shaped composition under atmospheric pressure thereby causing the cross-linking agent and the foaming agent to be concurrently decomposed and consequently giving rise to a foam, and subsequently mechanically deforming the resultant closed-cell foam thereby establishing intercommunication among the cells of the foam proves to be particularly suitable.

To be more specific, the aforementioned foamable cross-linkable composition is placed in a mold and thermally shaped under application of pressure with a press at a temperature to be selected in the range of 115° to 155° C., preferably 120° to 140° C., to suit the kind of the resin and the kind of the cross-linking agent being used. During this step of thermal shaping, the maintenance of the foamable cross-linkable composition in the state where its gel percent is zero throughout the entire process of shaping is the condition for obtaining an open-cell foam having an open-cell ratio of 100% or close to 100%. There is the possibility of a very minute amount of the foaming agent yielding to initial decomposition during this step of thermal shaping and causing the shaped composition to expand to roughly twice the original volume at the time of removal from the mold. However, this phenomenon is far from the concept of foaming and does not matter at all for this invention.

The foamable and cross-linkable composition which has been shaped as described above is then heated under atmospheric pressure thereby concurrently decomposing the cross-linking agent and the foaming agent. In this foaming and cross-linking step, the shaped composition is placed in a mold possessing desired cross-sectional shape and dimensions and not held in an airtight or hermetically sealed state and the metallic plate of the mold is externally heated to effect indirect heating of the composition held therein. The indirect heating is attained by attaching a heater fast to the outer surface of the metallic plate and energizing the heater and consequently heating the metallic plate or by providing the metallic plate with a flow path for a such as a jacket and circulating a thermal medium such as steam or hot oil through the flow path, and transferring the heat of the thermal medium to the metallic plate.

Alternatively, the shaped polyolefin composition is placed in an openable mold not held in an airtight state and directly heated as immersed in a heating medium, for instance metal bath containing Rose's alloy, Wood's alloy or the like, oil bath, molten salt bath containing one or more of the salt such as sodium nitrate, potassium nitrate, potassium nitrite or the like. Otherwise, the shaped composition is directly heated in the current of nitrogen gas, or in the state as covered with an iron sheet, etc. capable of moving up and down. After the heating is continued for a prescribed time, it is cooled to obtain a cooled foam.

The heating temperature is set at a level selected in the range of from 140° to 210° C., preferably 160° to 190° C., to suit the kind of the polyolefin being used. The heating time is in the range of 10 to 90 minutes, preferably 20 to 70 minutes.

In this way, there can be obtained a foam having closed cells of which membranes are able to be easily ruptured by exerting a mechanical deformation and the cross-linking degree (up to about 95% of gel percent) similar to that of the coventional foam.

In this invention, the heating in said foaming and cross-linking step may be carried out in two steps, so that the foaming and cross-linking conditions will be moderated and the decomposition of the cross-linking agent and that of the foaming agent will be accomplished more concurrently in two steps. Thus, the foamable cross-linkable composition is evenly heated, the unevenness of heating of the composition in the direction of thickness is eliminated, and the locally uneven foaming and the leakage of gas from the shaped mass of composition are prevented. When the heating in the foaming and cross-linking step is carried out in two steps as described above, the heating operation is performed effectively by setting the heating temperature in the second step at a level higher than that in the first step. For example, the first-step heating is carried out in the range of 145° to 180° C. and the second-step heating in the range of 170° to 210° C.

The foam (so-called closed-cell foam) which is obtained as described above is then subjected to compressive deformation using a synchronous two-arm roll, for example, to rupture the cell membranes and establish intercommunication among the cells and give rise to an open-cell foam. The intercommunication among the cells in the foam can be promoted by providing the synchronous two-arm roll on the surface thereof with countless small needles or disposing a roll provided with countless small needles before and/or after the synchronous two-arm roll and thereby puncturing countless small holes in the surface of the foam.

By this method is obtained an open-cell foam possessing an open-cell ratio of 100% or close to 100% as measured by the Remington Pariser method (ASTM D1940-62T).

The polyolefins which are effectively usable herein include polyethylene, ethylene-vinyl acetate copolymer, polypropylene, polytetrafluoroethylene, ethylene-propylene copolymer, poly-4-methyl-1-pentene, polyvinyl chloride, polyvinylidene chloride, polyvinylidene fluoride, and tetrafluoroethylene-ethylene copolymer, for example. From the standpoint of such physical properties as resiliency and cushioning property of the foam, the ethylene-vinyl acetate copolymer proves to be particularly desirable.

The halogen type flame-retarding agents which are usable in this invention are divided into bromine type and chlorine type agents. The bromine type flame-retarding agents prove to be more desirable in respect that they possess high flame-retarding property and do not liberate a harmful gas. The bromine type flame-retarding agents which are usable herein include inorganic type flame-retarding agents and chain hydrocarbon type, cyclic hydrocarbon type, and phosphorus type organic flame-retarding agents. Examples of such bromine type flame-retarding agents include, but are not limited to: ammonium bromide, chlorotetrabromobutane, vinyl bromide, tetrabromo-bisphenol A, tetrabromophthalic anhydride, hexabromobenzene, hexabromocyclododecane, bis(bromoethyl ether)-tetrabromo-bisphenol A, and tris(dibromopropyl)phosphate.

The amount of a halogen type flame-retarding agent to be added is in the range of 10 to 30 parts by weight, preferably 14 to 25 parts by weight, based on 100 parts by weight of the resin. If the amount is unduly small, the added agent fails to impart sufficient flame-retarding property and the decrease in the amount of a phosphorus type flame-retarding agent is not allowed. Conversely, if this amount is unduly large, the added flame-retarding agent brings about an adverse effect upon the foaming.

The cross-linking agents which are advantageously usable in the method for the production of an open-cell foam of the quality described above are organic peroxides. Examples of organic peroxides include, but are not limited to: dicumyl peroxide, 1,1-di-t-butyl peroxy-3,3,5-trimethyl cyclohexane, 2,5-dimethyl-2,5-di-t-butyl peroxyhexane, 2,5-dimethyl-2,5-di-t-butyl peroxyhexine, α,α'-bis(t-butylperoxy)diisopropyl benzene, t-butylperoxy ketone, and t-butylperoxy benzoate. The foaming agents which are advantageously usable herein are chemical foaming agents possessing decomposition temperatures exceeding the melting points of the polyolefin resins to be used. Examples of such chemical foaming agents include, but are not limited to: azo compounds such as azodicarbon amide and barium azodicarboxylates; nitroso type compounds such as dinitrosopentamethylene tetramine and trinitrosotrimethyl triamine; hydrazide type compounds such as p,p'-oxybisbenzene sulfonyl hydrazide; and sulfonyl semicarbazide type compounds such as p,p'-oxybisbenzene sulfonyl semicarbazide and toluene sulfonyl semicarbazide. Some, if not all, of these foaming agents permit additional use of a foaming aid. The foaming aids which are effectively usable herein include compounds having urea as a main component, basic zinc carbonate, metal oxides such as zinc oxide and lead oxide, and compounds having salicylic acid, stearic acid, etc. as a main component, namely higher fatty acids, and metal compounds of such higher fatty acids, for example.

Further, for the purpose of improving the physical properties of the composition to be used and lowering the price of the product, compounding agents (fillers) incapable of exerting any noticeable adverse effect on cross-linking bonding such as, for example, carbon black, metal oxides including zinc oxide, titanium oxide, calcium oxide, magnesium oxide and silicon oxide, carbonates including magnesium carbonate and calcium carbonate, fibrous substances including pulp, various dyes, pigments, and fluorescent substances, and rubber compounding ingredients commonly used, may be incorporated as occasion demands.

In this invention, the open-cell ratio of the open-cell foam to be impregnated with the phosphorus type flame-retarding agent is desired to exceed 80%, preferably 90%. If the open-cell ratio is less than 80%, the disadvantage arises that the open-cell foam is not easily impregnated with the phosphorus type flame-retarding agent such as, for example, a vinyl phosphonate compound.

The phosphorus type flame-retarding agents which are usable for impregnating the open-cell form in the next step of the process of this invention include non-halogen phosphoric esters, halogen-containing phosphoric esters, special phosphoric esters, and phosphorus-containing polyols, for example. Among these and other phosphorus type flame-retarding agents, vinyl phosphonate compounds prove to be particularly desirable because they excel in the flame-retarding effect.

These vinyl phosphonate compounds are desired to be those represented by the following general formula:

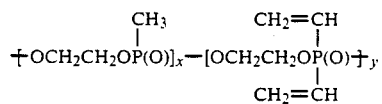

[wherein x and y are each equal to or more than 1]. In the compounds of said general formula, the phosphorus P is a flame-retarding element and contained in the compound in a proportion of about 22.5% by weight.

For the impregnation of the open-cell polyolefin foam with the vinyl phosphonate compound in this invention, first the vinyl phosphonate compound is dissolved in a solvent to be described specifically hereinbelow so as to be in a concentration in the range of 10 to 100% by weight, preferably 15 to 75% by weight. If the concentraion is less than 15%, the produced foam fails to acquire a self-extinguishing property. Conversely, if the concentration exceeds 75%, there arises the disadvantage that the solution possesses too high viscosity to allow effective impregnation.

Then, the impregnation of the open-cell cross-linked polyolefin foam with the aforementioned solution is effected by immersing the foam in the solution or spraying the solution on the foam by the use of a sprayer.

Subsequently, the open-cell foam which has been impregnated with said solution is wrung to remove excess solution and thoroughly dried in draft or under a vacuum to expel the solvent. The ratio of impregnation can be adjusted by the concentration of the solution and the manner of wringing after the impregnation.

The solvents which are effectively usable herein include water, acetone, ethanol, methylethyl ketone, ethyl acetate, benzene, and tetrahydrofuran, for example.

The foam dried as described above is irradiated with an ionizing radiation in an atmosphere of inert gas or under a vacuum. As an ionizing radiation, the $\gamma$ ray from Co 60 or the electron beam from an accelerator may be conveniently used. By irradiating the foam mentioned above at a temperature in the range of 10° to 50° C. with the radiation at a dose rate of from 1.0 to $1.0 \times 10^7$ rads/sec. and a dose of from 1 to 20 Mrads, for example, an insoluble polymer of said phosphorus type flame retarding agent is produced in the interior and the surface of the foam. As a result, the impartation of a lasting flame-retarding property can be accomplished.

For the effect of this invention to be prominent, the ratio of increase of weight which is attained in the foam produced as described above is desired to be not less than 5% by weight, preferably not less than 10%, based on the weight of the foam before the impregnation thereof with the phosphorus type flame-retarding agent. Though the upper limit of this increase in weight of the foam is not specifically limited from the functional point of view, the ratio of increase is desired to be not more than 60% from the economic point of view.

Though the various flame-retardant open-cell cross-linked polyolefin foams mentioned above are usable in the present invention, those using a halogen type flame-retarding agent and a phosphorus type flame-retarding agent in combination prove to be particularly useful. This is because the combined use of a halogen type flame-retarding agent and a phosphorus type flame-retarding agent serves the purpose of decreasing the consumption of the phosphorus type flame-retarding agent which is expensive, lowering the cost of production of the foam, and allowing impartation of an outstanding flame-retarding property to the foam owing to the synergistic effect between the halogen type flame-retarding agent distributed in the cell membranes and the phosphorus type flame-retarding agent deposited on the surface of the cell membranes and on the surface of the foam as well. To be specific, the prevention of the polyolefin from ignition and combustion accomplished and the self-extinguishing property exhibited by the phosphorus type flame retarding agent present on the surface of the cell membranes and the surface of the foam and the combustion-proofing property and the self-extinguishing property manifested by the halogen type flame-retarding agent present in the cell membranes are synergized to allow impartation of an outstanding flame-retarding property.

To the flame-retardant open-cell cross-linked polyolefin foam of this quality, at least part of the surface thereof, an adhesive agent containing thermally expansible graphite, is then applied.

The thermally expansible graphite to be used in this invention is produced by subjecting natural graphite powder to an oxidizing treatment or to electrolytic oxidation and washing and drying the oxidized graphite powder [see, for example, Japanese Patent Publication No. SHO 60(1985)-34,492 and Japanese Patent Application laid open to public inspection; KOKAI No. SHO 63(1988)-195,104, the teachings of which are hereby incorporated by reference]. When this thermally expansible graphite is heated at a temperature of about 1,000° C., it is converted into very light graphite having a crystal layer interstice expanded to about 200 times the size existing before the heating and exhibiting a bulk density of about 0.01g/cm$^3$ and possessing outstanding heatproofness as well.

Though the adhesive agent to be used in this invention is not particularly limited, isocyanate type, vinyl acetate type, acrylic type, or other similar aqueous emulsion type adhesive agent proves to be desirable from the standpoint of odor, toxicity, inflammability, effect on the foam, and price.

As respects the dispersion of the thermally expansible graphite in the adhesive agent involved in this invention, when the adhesive agent to be used is of an aqueous emulsion type, this adhesive agent is diluted with water to lower the viscosity thereof and the thermally expansible graphite is added to the diluted adhesive agent and stirred to be uniformly dispersed therein. The coating of the surface of the flame-retardant open-cell cross-linked polyolefin foam is effected by applying the prepared adhesive agent by spraying or brushing to the surface of the foam and drying the applied layer of the adhesive layer. Where the open-cell foam has the shape of sheet, the flame-retarding effect is manifested by the application of the adhesive agent to one surface of the sheet foam and manifested prominently by the application to both surfaces of the sheet foam. The amount of the thermally expansible graphite to be applied to the surface of the open-cell foam is desired to be not less than 3.0 mg/cm$^2$, preferably not less than 6.0 mg/cm$^2$.

The non-flammable open-cell cross-linked polyolefin foam which is produced by the method of this invention is vested with an extremely high flame-retarding property or non-flammability by the synergistic operation between the flame-retarding effect of the flame-retarding agent present in the interior and the surface of the open-cell foam and the combustionproofing effect due to the outstanding heatproofness of the thermally expansible graphite and the expansion of this graphite during the application of heat. This non-flammability is sufficient to pass the combustion test performed on flooring materials and sheet cushions as specified in Code of Federal Regulations (CFR) published by U.S. Government Printing Office under Title No. 14 (Aircraft and Space), Part 25.853 (b). It does not appreciably affect the outstanding physical properties of an open-cell foam such as flexibility and elongation. The non-flammable open-cell foam obtained by the method of this invention, therefore, is highly useful not only for the conventional construction materials (heat insulating material, etc.) but also for seat cores, flooring materials, walling materials, and other interior materials for aircraft, and cushion materials, noise abating materials, air filters and other similar materials in space industry and various other fields.

For more specific illustration of the present invention, the following examples are presented which are intended to be merely illustrative of and not in any sense limitative of the invention.

EXAMPLE 1

(A) Production of flame-retardant open-cell cross-linked polyolefin foam

A composition consisting of 100 parts by weight of an ethylene-vinyl acetate copolymer having a vinyl acetate content of 16% by weight (produced by Mitsubishi Petro-Chemical Co., Ltd. and marketed under trademark designation of "Yukalon EVA-41H"), 18 parts by weight of azodicarbonamide, 0.05 part by weight of activated zinc white, 0.8 part by weight of dicumyl peroxide, and 20 parts by weight of a brominated aromatic compound (halogen type flame-retarding agent produced by Dai-ichi Kogyo Seiyaku Co., Ltd. and marketed under trademark designation of "Pyrogard SR-600A") was throughly kneaded in a mixing roll at 85° C. In a mold (195×380×28 mm$^3$) held inside a press heated at 120° C., the resultant composition was heated under applicaiton of pressure for 40 minutes, to produce a foamable and cross-linkable sheet. The gel percent of this foamable and cross-linkable sheet was zero. The foamable and cross-linkable sheet was placed in a non-airtight openable mold (1,000×500×100 mm$^3$) heated in advance to 170° C., heated for 60 minutes with steam supplied by the jacket system at 170° C., cooled, and then removed from the mold, to produce a foam.

The foam thus obtained was passed five times through a synchronous two-arm roll having the two rolls thereof separated by a fixed distance of 20 mm to rupture the cell membranes and establish intercommunication among the cells. The resultant open-cell foam was found to possess a bulk density of 0.03 g/cm$^3$, an open-cell ratio of 100%, and an average cell diameter of about 2 mm.

The open-cell foam was immersed in a methanol 25% vinyl phosphonate compound (produced by AKZO Chemicals of U.S.A. and marketed under trademark designation of "Fyrol") solution to be impregnated with the solution. The impregnated foam was removed from the solution and dried in draft to expel methanol. The thoroughly dried foam was placed in a bag of polyethylene, swept with nitrogen for 10 minutes, and then sealed airtightly in the bag. The foam in the bag was placed on a conveyor and irradiated at room temperature with the electron beam emitted at a rate of 2.1×10$^6$ rads/sec. under the conditions of 800 KeV and 6 mA from a transformer rectifying type electron beam accelerator to a dose of 10 Mrads. The ratio of increase of the weight of the foam after the irradiation was 40.0% based on the weight of the foam before the irradiation.

(B) Preparation of adhesive agent having thermally expansible graphite dispersed therein One hundred (100) parts by weight of an acrylic aqueous emulsion type adhesive agent having an involatile content of 54% (produced by Konishi K.K. and marketed under trademark designation of "Bond SP220") was diluted with 50 parts by weight of water to lower the viscosity thereof. To the diluted adhesive agent, 100 parts by weight of thermally expansible graphite (Produced by Nihon Kasei K.K. and marketed under product code of "CA-60") and 5 parts by weight of a surfactant were added and stirred to be uniformly dispersed.

(C) Production of non-flammable open-cell foam

A sheet measuring 78×350×20 mm$^3$ was cut from the flame-retardant open-cell cross-linked polyolefin foam produced in the preceding step (A) and the adhesive agent containing thermally expansible graphite produced in the step (B) was applied twice by brushing to one surface of the open-cell foam sheet. By calculation in accordance with the following formula using the change of weight of the sheet and the involatile content of the adhesive agent, the amount of the thermally expansible graphite deposited per unit surface area was found to be 7.1 mg/cm$^2$.

$$G = \frac{(B - A) - (C - D) \times E}{(1 - E) \times F}$$

wherein A stands for the weight (g) of the foam before the treatment, B for the weight (g) of the foam found after the applied layer of the thermally expansible graphite-containing adhesive agent had been dried, C for the weight (g) of the adhesive agent containing the thermally expansible graphite and water, D for the weight (g) of the water added to the adhesive agent, E for the involatile content (percent)/100 of the adhesive agent used, F for the surface area (cm$^2$) of the foam coated with the adhesive agent, and G for the amount of the thermally expansible graphite deposited (g/cm$^2$).

(D) Combustion test

Then, the non-flammable open-cell foam sheet obtained as described above was set upright on its side and a gas burner (produced by Prince Kaihatsukogyo K.K. and marketed under trade-mark designation of "Prince Gas Burner GB2001") was placed at a distance of 40 mm from the sheet so that the flame from the gas burner would impinge on the vertical surface of the sheet at the highest temperature (1,130° C.). The sheet was exposed to the flame of the burner for two minutes. The flame formed a dent about 0.7 cm in depth in the surface of the sheet but failed to ignite the open-cell foam.

EXAMPLE 2

A non-flammable open-cell cross-linked polyolefin foam was produced by faithfully following the procedure of Example 1, excepting the adhesive agent containing the thermally expansible graphite was applied just once. The calculation performed in accordance with the same formula as used in Example 1, the amount of the thermally expansible graphite deposited per unit surface area was found to be 3.2 mg/cm$^2$ In the combustion test performed by following the procedure of Example 1, the flame formed a dent about 1.3 cm in depth in the surface but failed to ignite the open-cell foam.

The adhesive agent containing the thermally expansible graphite prepared by following the procedure of Example 1 was applied just once thinly to the same flame-retardant open-cell cross-linked polyolefin foam. The amount of the thermally expansible graphite deposited per unit surface area was found to be 2.3 mg/cm$^2$. The resultant open-cell foam sheet passed the combustion test of CFR mentioned above. In the combustion test performed in the same manner as in Example 1, however, the open-cell foam caught fire and the portion of the foam exposed to the flame sustained a hole.

From these results, it is clearly noted that for the open-cell cross-linked polyolefin foam to acquire non-flammability, the amount of the thermally expansible graphite to be deposited is desired to be not less than 3 mg/cm$^2$.

COMPARATIVE EXPERIMENT 1

A flame-retardant open-cell cross-linked polyolefin foam was produced by following the procedure of the step (A) of Example 1. When this flame-retardant open-cell cross-linked polyolefin foam was subjected to the same combustion test as in Example 1, the open-cell foam caught fire and the portion of the foam exposed to the flame sustained a hole.

COMPARATIVE EXPERIMENT 2

An adhesive agent containing a thermally expansible graphite was produced by following the procedure of Example 1. A sheet 78×350×20 mm$^3$ was cut from an ordinary open-cell cross-linked polyolefin foam possessing a bulk density of 0.03 g/cm$^3$ and an open-cell ratio of 100% (produced by Sanwa Kako K.K. and marketed under trademark designation of Opcell LC-300#3"). The adhesive agent was applied twice by brushing to one surface of said open-cell foam sheet. The amount of the thermally expansible graphite deposited per unit surface area was found to be 14 mg/cm$^2$. When this open-cell foam sheet was subjected to the same combustion test as in Example 1, it caught fire and the portion of the foam exposed to the flame sustained a hole.

EXAMPLES 3 TO 7

Non-flammable open-cell foams were produced by following the procedure of Example 1, excepting a halogen type flame-retarding agent (produced by SAI-TECH Inc. and marketed under trademark designation of SAYTEX BT-93") was used instead, the proportion of the halogen type flame-retarding agent incorporated in the polyolefin composition was varied as indicated in Table 1 below, and the ratio of vinyl phosphonate absorbed by the open-cell foam (indicated by the ratio of increase of weight of the foam after polymerization and drying) was varied as indicated in Table 1.

TABLE 1

| Example No. | Number of parts of halogen type flame-retarding agent (phr) | Concentration of vinyl phosphonate solution (%) | Ratio of increase of weight of foam by incorporation of vinyl phosphonate (%) |
| --- | --- | --- | --- |
| Example 3 | 8 | 33 | 69.4 |
| Example 4 | 8 | 33 | 62.5 |
| Example 5 | 16 | 25 | 37.5 |
| Example 6 | 16 | 25 | 51.2 |
| Example 7 | 16 | 33 | 61.4 |

When the non-flammable open-cell foams were subjected to the same combustion test as in Example 1, they possessed sufficient non-flammability as evinced by perfect absence of ignition.

EXAMPLE 8

A sheet measuring 200×100×5 mm$^3$ was cut from an open-cell foam made of an ethylene-vinyl acetate copolymer possessing an average cell diameter of 2 mm, an open-cell ratio of 100%, and a bulk density of 0.027 g/cm$^3$ (produced by Sanwa kako K.K. and marketed under trademark designation of Opcell LC-300 #3"). This open-cell foam sheet was impregnated with a methanol 50% vinyl phosphonate compound solution (trademark designation of "Fyrol 76") and then dried in draft to expel the methanol. The thoroughly dried foam was placed in a bag of polyethylene, swept with nitrogen gas for 10 minutes, and then sealed airtightly in the bag. The foam in the bag was placed on a conveyor and irradiated at room temperature with the electron beam emitted at a rate of 9.2×10$^4$ rads/sec under the conditions of 1.5 MeV and 50 μA from a Van de Graaff accelerator.

The irradiated foam was washed with water and immersed in warm water at 50° C. to remove the unreacted monomer and the water-soluble polymer. The resultant dry foam was found to have attained an increase of weight by 65.3% based on the weight of the foam before the treatment. An adhesive agent containing thermally expansible graphite was prepared by following the procedure of Example 1. This adhesive agent was applied twice by brushing to the surface of the foam. When the coated foam was subjected to the same combustion test as in Example 1, it possessed sufficient non-flammability as evinced by total absence of ignition.

What is claimed is:

1. A non-flammable open-cell cross-linked polyolefin foam, which is characterized by having at least part of the surface of a flame-retardant open-cell cross-linked polyolefin foam coated with an adhesive agent containing thermally expansible graphite.

2. The non-flammable open-cell cross-linked polyolefin foam according to claim 1, wherein said flame-retardant open-cell cross-linked polyolefin foam is an open-cell cross-linked polyolefin foam having a polymer of a phosphorus type flame-retarding agent in the interior and the surface of said open-cell foam.

3. The non-flammable open-cell cross-linked polyolefin foam according to claim 1, wherein said flame-retardant open-cell cross-linked polyolefin foam is an open-cell cross-linked polyolefin foam containing a halogen type flame-retarding agent in the cell membranes thereof and having a polymer of a phosphorus type flame-retarding agent in the interior and the surface of said open-cell foam.

4. The non-flammable open-cell cross-linked polyolefin foam according to claim 2 or 3, wherein said phosphorus type flame-retarding agent is a vinyl phosphonate compound.

5. The non-flammable open-cell cross-linked polyolefin foam according to claim 3, wherein said halogen type flame-retarding agent is a bromine type flame-retarding agent.

6. The non-flammable open-cell cross-linked polyolefin foam according to claim 5, wherein said bromine type flame-retarding agent is ammonium bromide, chlorotetrabromobutane, vinyl bromide, tetrabromobisphenol A, tetrabromophthalic anhydride, hexabromobenzene, hexabromocyclododecane, bis(bromoethyl ether)tetrabromobisphenol A, or tris(dibromopropyl)phosphate.

7. The non-flammable open-cell cross-linked polyolefin foam according to claim 1, wherein said thermally expansible graphite is produced by subjecting natural graphite powder to an oxidizing treatment or electrolytic oxidation, washing the oxidized graphite with water, and drying the washed graphite and possesses a nature of having the crystal layer interstice thereof expanded greatly when heated to an elevated temperature.

8. The non-flammable open-cell cross-linked polyolefin foam according to claim 1, wherein the amount of said thermally expansible graphite to be applied to the surface of said foam is at least 3 mg/cm$^2$.

9. The non-flammable open-cell cross-linked polyolefin foam according to claim 1, wherein said adhesive agent is an aqueous emulsion type adhesive agent.

10. A method for the production of a non-flammable open-cell cross-linked polyolefin foam, which comprises dispersing a thermally expansible graphite in an adhesive agent and applying the resultant adhesive agent mixture to at least part of the surface of a flame-retardant open-cell cross-linked polyolefin foam.

11. The method according to claim 10, wherein the amount of said thermally expansible graphite to be applied to the surface of said foam is at least 3 mg/cm$^2$.

12. The method according to claim 10, wherein said adhesive agent is an aqueous emulsion type adhesive agent.

13. The method according to claim 10, wherein said flame-retardant open-cell cross-linked polyolefin foam is an open-cell cross-linked polyolefin foam having a polymer of a phosphorus type flame-retarding agent in the interior and the surface of said open-cell foam.

14. The method according to claim 10, wherein said flame-retardant open-cell cross-linked polyolefin foam is an open-cell cross-linked polyolefin foam containing a halogen type flame-retarding agent in the cell membranes thereof and having a polymer of a phosphorus type flame-retarding agent in the interior and the surface of said open-cell foam.

15. The method according to claim 13 or 14, wherein said phosphorus type flame-retarding agent is a vinyl phosphonate compound.

16. The method according to claim 14, wherein said halogen type flame-retarding agent is a bromine type flame-retarding agent.

17. The method according to claim 16, wherein said bromine type flame-retarding agent is ammonium bromide, chlorotetrabromobutane, vinyl bromide, tetrabromobisphenol A, tetrabromophthalic anhydride, hexabromobenzene, hexabromocyclododecane, bis(bromoethyl ether)tetrabromobisphenol A, or tris(dibromopropyl)phosphate.

18. The method according to claim 10, wherein said thermally expansible graphite is produced by subjecting natural graphite powder to an oxidizing treatment or electrolytic oxidation, washing the oxidized graphite with water, and drying the washed graphite and possesses a nature of having the crystal layer interstice thereof expanded greatly when heated to an elevated temperature.

19. A method for the production of a non-flammable open-cell cross-linked polyolefin foam, which comprises impregnating an open-cell cross-linked polyolefin foam with a phosphorus type flame-retarding agent, then irradiating the resultant impregnated open-cell cross-linked polyolefin foam with an ionizing radiation thereby giving rise to an insoluble polymer of said phosphorus type flame-retarding agent in the interior and the surface of said open-cell foam and consequently producing a flame-retardant open-cell cross-linked polyolefin foam, and applying an adhesive agent containing a thermally expansible graphite to at least part of the surface of said flame-retardant open-cell cross-linked polyolefin foam.

20. The method according to claim 19, wherein said phosphorus type flame-retarding agent is a vinyl phosphonate compound.

21. The method according to claim 20, wherein said impregnation of said open-cell cross-linked polyolefin foam with said vinyl phosphonate compound is effected by immersing said open-cell foam in a solution containing said vinyl phosphonate compound in a concentration of at least 10% by weight or applying said solution to said open-cell foam, then wringing the resultant wet open-cell foam to expel excess solution, and drying the resultant open-cell foam to expel said solvent by vaporization.

22. The method according to claim 19, wherein said ionizing radiation is an electron beam or a $\gamma$ ray.

23. The method according to claim 19, wherein said open-cell foam is irradiated with said ionizing radiation in an atmosphere of inert gas or under a vacuum at a dose rate in the range of 1.0 to $1.0 \times 10^7$ rads/sec. to a dose in the range of 1 to 20 Mrads.

24. The method according to claim 19, wherein the content of said phosphorus type flame-retarding agent in said open-cell foam is at least 5% by weight, based on the weight of said open-cell foam before said impregnation.

25. The method according to claim 19, wherein the amount of said thermally expansible graphite to be applied to the surface of said flame-retardant open-cell cross-linked polyolefin foam is at least 3 mg/cm².

26. The method according to claim 19, wherein said open-cell cross-linked polyolefin foam is a flame-retardant open-cell cross-linked polyolefin foam containing a halogen type flame-retarding agent in the cell membranes thereof.

27. A method for the production of a non-flammable open-cell cross-linked polyolefin foam, which comprises foaming a foamable and cross-linkable polyolefin resin composition containing a halogen type flame-retarding agent thereby forming a foam, then mechanically deforming said foam thereby establishing intercommunication among the cells of said foam and producing an open-cell cross-linked polyolefin foam, impregnating said open-cell cross-linked polyolefin foam with a phosphorus type flame-retarding agent, subsequently irradiating the impregnated open-cell cross-linked polyolefin foam with an ionizing radiation thereby forming an insoluble polymer of said phosphorus type flame-retarding agent in the interior and the surface of said open-cell foam and consequently producing a flame-retardant open-cell cross-linked polyolefin foam, and thereafter applying an adhesive agent containing a thermally expansible graphite to at least part of the surface of said flame-retardant open-cell cross-linked polyolefin foam.

28. The method according to claim 27, wherein said halogen type flame-retarding agent is incorporated in said foamable and cross-linkable polyolefin resin composition in a ratio in the range of 10 to 30 parts by weight, based on 100 parts by weight of said polyolefin resin.

29. The method according to claim 27, wherein said halogen type flame-retarding agent is a bromine type flame-retarding agent.

30. The method according to claim 27, wherein said phosphorus type flame-retarding agent is a vinyl phosphonate compound.

31. The method according to claim 27, wherein the amount of said thermally expansible graphite to be applied to the surface of said flame-retardant open-cell cross-linked polyolefin foam is at least 3 mg/cm².

* * * * *

UNITED STATES PATENT AND TRADEMARK OFFICE
CERTIFICATE OF CORRECTION

PATENT NO. : 5,132,171
DATED : July 21, 1992
INVENTOR(S) : Yoshizawa, et. al.

It is certified that error appears in the above-indentified patent and that said Letters Patent is hereby corrected as shown below:

Title page, item [73], Assignee: should read--Research Development Corporation of Japan--.

Signed and Sealed this

Third Day of June, 1997

Attest:

BRUCE LEHMAN

Attesting Officer

Commissioner of Patents and Trademarks